United States Patent [19]

Gutjahr et al.

[11] 4,245,243

[45] Jan. 13, 1981

[54] SYSTEM FOR REGISTERING AND SORTING OUT NOT PROPERLY FILLED DEEP-DRAWN PACKAGES IN A PACKAGING MACHINE

[75] Inventors: Lothar Gutjahr, Denzlingen; Gerhard Grube, Löhne, both of Fed. Rep. of Germany

[73] Assignee: Kloeckner-Werke AG, Duisburg, Fed. Rep. of Germany

[21] Appl. No.: 826,743

[22] Filed: Aug. 24, 1977

[30] Foreign Application Priority Data

Aug. 25, 1976 [DE] Fed. Rep. of Germany ...... 2638138

[51] Int. Cl.³ ............................................. H04N 7/18
[52] U.S. Cl. .................................. 358/106; 250/223 R
[58] Field of Search ............... 356/237, 240; 358/106, 358/93, 105; 250/562, 563, 223 R, 223 B; 209/936, 939

[56] References Cited

U.S. PATENT DOCUMENTS

| Re. 28,984 | 9/1976 | Drinkuth et al. | 358/106 |
|---|---|---|---|
| 3,049,588 | 8/1962 | Barnett | 358/105 |
| 3,590,151 | 6/1971 | Keith | 358/105 |
| 3,936,800 | 2/1976 | Ejiri et al. | 358/105 |
| 3,963,354 | 6/1976 | Feldman et al. | 356/237 |
| 3,987,244 | 10/1976 | Messman | 358/106 |
| 4,134,498 | 1/1979 | Jones et al. | 250/223 R |

*Primary Examiner*—Robert L. Griffin
*Assistant Examiner*—Joseph A. Orsino, Jr.

*Attorney, Agent, or Firm*—Michael J. Striker

[57] ABSTRACT

A reference package or packages comprised of an orderly group of properly filled compartments is moved into a testing station, where its image is picked up by a television camera. The picture signal produced by the camera is digitalized and stored in a circulating memory for repeated read-out. Thereafter, successively, a package or packages comprised of compartments to be examined, and exhibiting the same orderly arrangement as the properly filled compartments, are moved into the testing station. The picture signal produced by the camera during pick-up of the successive images is synchronously compared with reconstituted analog picture information read out from the memory. Discrepancies in the compared information result in error signals used to produce discard signals. Groups of packages, arranged in rows extending transverse and parallel to the scan lines of the camera tube, can be tested. The operator uses a selector device to establish x-coordinate zones or y-coordinate zones, or x-y sectors defined by x- and y-coordinate zones in conjunction. Error signals are automatically correlated with the zones or sectors, and thereby with the individual rows of packages or the individual packages to which the error signals are attributable, and discard signals correlated with individual rows of packages or individual packages are produced, for subsequent use at a sorting station, to eject not properly filled rows of packages or not properly filled individual packages.

8 Claims, 10 Drawing Figures

SYSTEM FOR REGISTERING AND SORTING OUT NOT PROPERLY FILLED DEEP-DRAWN PACKAGES IN A PACKAGING MACHINE

BACKGROUND OF THE INVENTION

The invention relates to methods and systems for registering and sorting out packages having not properly filled deep-drawn compartments, in a packaging installation. Typically, these packages comprise a base foil in which the compartments to be filled are formed by deep-drawing. The compartments are then filled, and a cover foil is applied to seal them, forming a strip of such packages which is transported through the packaging installation.

Usually, the base foil is pulled off a supply roll and transported via guide rollers to a deep-drawing station, at which compartments are formed by deep-drawing. The deep-drawn base foil is transported through a filling station where the individual compartments are filled. The base foil is then transported through a sealing station, where a cover foil is applied and sealed to the base foil along predetermined seal lines. The strip of packages is then transported through a stamping or cutting station, where the strip is severed transversely (and also longitudinally in certain cases) to form the individual packages. Typically, each package is comprised of an orderly group of compartments arranged in rows extending both parallel to and transverse to the transport direction. After the individual packages are severed from the strip, they are transported through a sorting station, where not properly filled packages are sorted out. The examination of compartments arranged in transverse and longitudinal rows, and the automatic discarding of the packages into which the orderly groups of compartments are cut, present problems to which a reliable general solution has not hitherto been found.

It is known to provide a testing station intermediate the filling station and the sealing station. Mechanical devices located above the open compartments of the base foil, such as sensing pins, levers or lever-mounted rollers, move into the individual compartments until they contact the goods therein. This provides a direct indication of the extent to which the compartments are properly filled. The sensing elements must be organized in correspondence to the organization of the compartments in each successive group of compartments to be tested (e.g., 3 by 4). Thus, in general, each such sensing arrangement is limited to use for compartments exhibiting a predetermined organization and set of dimensions. Each time compartments of different organization or dimensions are to be tested, the set of sensing elements must be replaced by another. Furthermore, because these sensing elements must physically contact the goods in the individual compartments, the testing operation must be performed before the cover foil is applied to the deep-drawn base foil.

It is known to test without physically contacting the goods in the compartments. A light source is arranged at one side of the transported strip of uncut packages, and a light detector at the other side. The intensity of the light transmitted through the individual compartments and incident upon the light detector provides an indication of whether the compartments are properly filled. If the testing operation is performed prior to application of the cover foil, then at least the base foil must be transparent; if performed after the cover foil is applied, then both the base foil and the cover foil must be transparent.

It is also known to arrange the light detector to receive light reflected from the individual compartments. The amount of light reflected from a not properly filled compartment is presupposed to differ from that reflected from a properly filled compartment. The utility of this technique is limited to situations where a reliable distinction exists between the reflection of light from properly and not properly filled compartments, for example where the compartments contain tablets.

Another known technique involves weighing the transported strip of packages at a weighing station upstream or downstream of the sealing station. This technique presupposes that the detected weight of properly and not properly filled packages can be reliably distinguished, and that variations in other parameters, such as the weight of sections of foil of somewhat varying thickness, will not lead to the generation of discard signals.

SUMMARY OF THE INVENTION

It is a general object of the invention to provide a method and system for registering and sorting out packages containing not properly filled compartments capable of quick and easy conversion from one packaging format to another. The unit output of modern packaging machines is so high that time-consuming conversions to accommodate changes of packaging format result in a significant drop in production.

According to the preferred concept of the invention, a testing station is provided either upstream or downstream of the station where the cover foil is applied to the deep-drawn base foil. An orderly group of properly filled compartments, destined to form a single multi-compartment package or a plurality of packages, is moved into the testing station and used as a standard. The testing station is provided with a T.V. camera which picks up an image of the orderly group of properly filled compartments. The picture signal produced by the camera is stored for use as reference information, and repeatedly read out from the storage. Thereafter, successive groups of compartments to be tested, having the same format as the reference group, are transported through the testing station. The T.V. camera picks up the image of each successive group of compartments, and the image content of the resultant picture signal is synchronously compared with the reference information read out from the storage. Error signals are generated in response to discrepancies between the information being compared, and are used to produce discard signals.

Discard signals should not be produced in response to image discrepancies resulting during the transport of the group of compartments just tested out of the testing station and/or the transport of the next group to be tested into the testing station. Discard signals should be produced only in response to error signals generated when a compartment group to be examined is located in exactly the position previously occupied by the compartments used as the reference group.

Usually, the deep-drawn base foil is transparent and the cover foil is made of, for example, aluminum. If the testing station is located upstream of the station at which the cover foil is applied, the T.V. camera can be arranged either above or below the deep-drawn base foil.

If each group of compartments is, for example, destined to form six multi-compartment packages, constituted by three rows of packages each extending transverse to the transport direction, then the discard signals should be correlated with individual ones of the six packages. However, it is not in general necessary to correlate the discard signals with specific ones of the compartments in each multi-compartment package.

The inventive system is applicable for both transparent and non-transparent cover foils. If the cover foil is transparent and the T.V. camera is arranged above the cover foil, the testing station can be upstream or downstream of the station where the cover foil is applied. If the cover foil is not transparent, the testing station can be located upstream or downstream of the station where the cover foil is applied, provided the T.V. camera is located facing the base foil. If the camera is arranged facing the tops of the compartments, and the cover foil is not transparent, then the testing station should be located upstream of the station where the cover foil is applied.

The inventive method and system can in principle be used irrespective of whether the strip of packages is transported intermittently or continuously.

If the strip of packages is transported intermittently, the camera can be permitted to pick up, at any one time, the image of only the compartments destined to form a single transverse row of packages. In many cases, the number of packages in a transverse package row will be only one, two or three. In that event, it is simplest to perform the image comparisons on a complete-image basis, i.e., not to resolve the images being compared into zones corresponding to individual ones of a transverse row of two or three packages. Certainly, if the transverse row of packages consists of just one package, there is no need to compare images on an image-zone basis. For this simplest case, it makes no difference, in terms of implementing circuitry, whether the scan lines of the T.V. camera pick-up tube extend parallel to or transverse to the transport direction of the strip of packages.

If the testing system is to test, during a single testing operation, only one transverse row of packages, but the row contains a larger number of packages, or if in general for economic reasons it is desired not to discard an entire transverse row when only one package thereof is improperly filled, then it is preferred to orient the camera pick-up tube so that its scan lines extend parallel to the transport direction. Logic circuitry is employed to subdivide the images being compared into x-coordinate zones, each zone consisting of a plurality of adjoining image lines. The images being compared are then compared, not on a complete-image basis, but instead on an x-coordinate zone basis. Generated error signals are correlated with the individual image zones, and thereby with the individual packages of the transverse row located in those zones, and the discard signals are generated in correlation with individual packages, so that an entire transverse row need not be wastefully discarded.

If, during a single testing operation, a plurality of transverse rows of packages is to be tested, then it is contemplated to subdivide the images being compared not only into x-coordinate zones (zones each extending in the transport direction), but also into y-coordinate zones (zones each extending transverse to the transport direction), to form x-y sectors correlated with the individual packages of the plural transverse rows. Error signals are then correlated with individual x-y sectors, so that resultant discard signals will be correlated with individual not properly filled packages.

In principle, only a single picked-up image of a group of containers to be examined need be compared against the reference image; i.e., during each testing operation, the T.V. camera need be permitted to generate a picture signal for only one image-period of its operation, and only one comparison between the picked-up image and the reference image is performed. This may be appropriate, for example, when the strip of packages is intermittently transported. Alternatively, the comparison between the image picked-up by the camera and the reference image can be performed continually, i.e., even when a group of containers just examined is moving out of the testing station and the next group is moving in. In that event, a considerable number of error signals will be produced intermediate successive testing operations. According to one concept of the invention, use is made of a gating circuit which is in continual receipt of these error signals. The gating circuit is enabled in synchronism with package transport, so that discard signals can be generated in response to error signals, only for error signals generated at a time when a group of compartments to be examined is in exactly the position earlier occupied by the reference group.

In order to assure a meaningful comparison between the picked-up image of the group of compartments to be examined and the reference image, it is of course necessary that the images to be compared be in good register. This can be difficult when the dimensions of successive groups of compartments are not identical. For example, certain sections of the base foil may be of slightly greater thickness than others, and when subjected to tension at the deep-drawing station the thinner sections may be in stretched condition. As a result, thereafter, the distance between adjoining compartments of the thinner sections of base foil will be different from that of the thicker sections of base foil. To overcome the resultant registration problem, it is contemplated to employ an apertured masking plate arranged between the camera and the group of compartments to be examined. The masking plate is provided with openings organized in correspondence to the compartments of the group of compartments, but the openings are of somewhat smaller dimensions than the compartments. For example, the compartments and likewise the openings in the masking plate may be circular, but the diameters of the latter somewhat smaller than the diameters of the former. In this way, unavoidable variations in the inter-compartment spacing will not produce improper error signals, provided that these variations are less than one half the difference between the two diameters.

When an apertured masking plate is employed, the camera can be located facing one side of the strip of packages, with a light source facing the other side. When the reference group of compartments is being imaged, the attenuation of light transmitted through each properly filled compartment and associated opening in the masking plate will be the same, and the picked-up image will consist of an orderly arrangement of circles of light. During subsequent testing operations, an incompletely filled compartment or a completely unfilled compartment will attenuate light to a different degree or not al all, and a discard signal will be generated.

The camera, the framing structure and (if used) the light source can be so arranged as to be all located facing one side of the strip of packages, i.e., either the base foil side or the side at which the cover foil is applied, for reflective operation, or else at opposite sides for transmissive operation. Accordingly, dark-field illumination or light-field illumination can be employed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
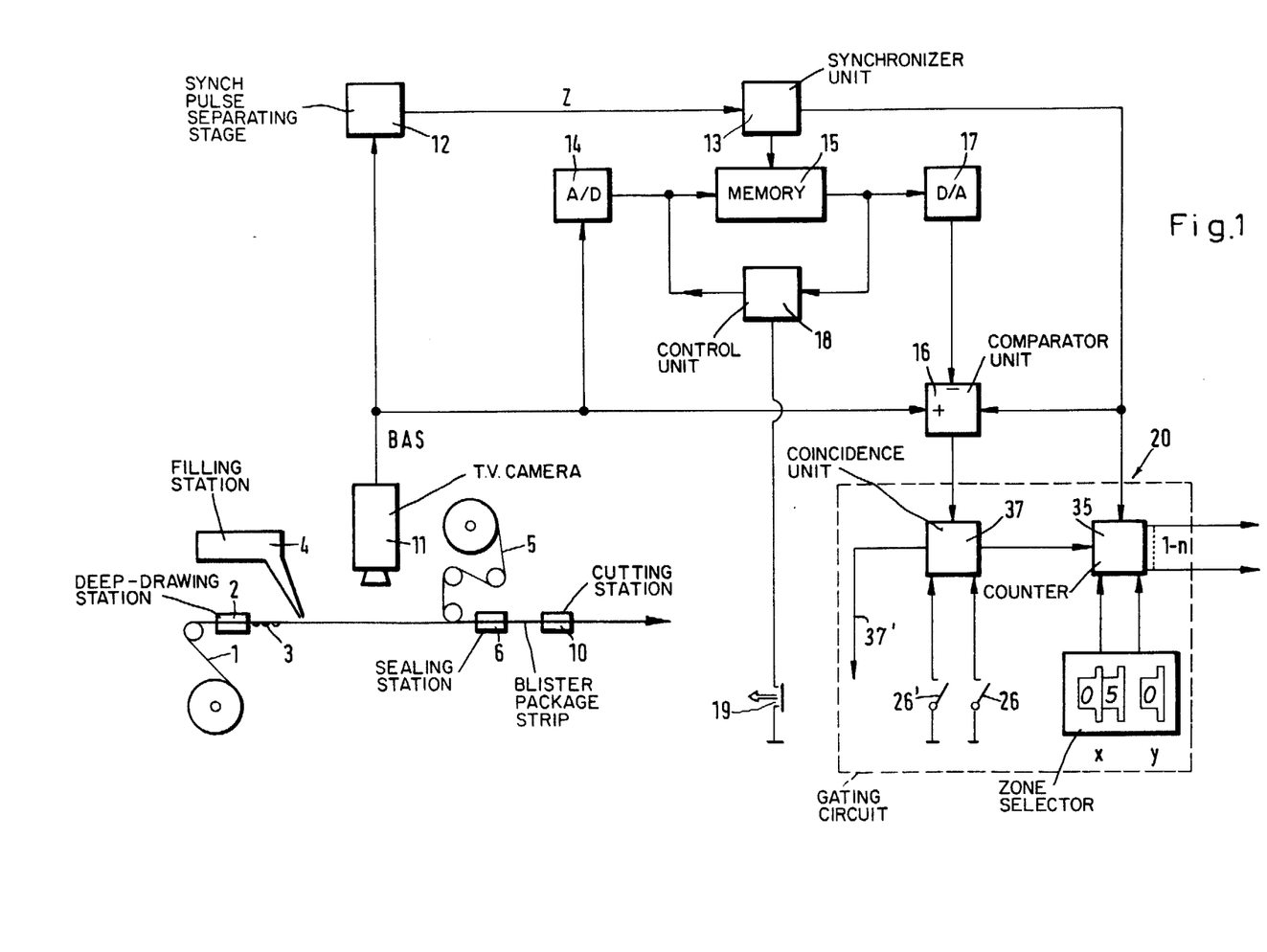
FIG. 1 is a schematic depiction of a packaging installation and of an inventive testing system used therewith.

FIG. 1 schematically depicts an exemplary embodiment of the inventive system, including the individual operating stations of the packaging machine. A base foil 1 is pulled off a supply roll and transported through a deep-drawing station 2, at which the compartments 3 to be filled are formed (only a few compartments 3 are shown in FIG. 1). At a filling station 4, the goods to be packaged are filled into the compartments 3. The goods in question may be tablets, granular material, liquid, etc. The number of units or amount of material filled into each compartment 3 is predetermined, in conventional manner. A cover foil 5 is pulled off another supply roll and laid atop the deep-drawn base foil 1 to cover the compartments 3 thereof at a location upstream of a sealing station 6. At the sealing station 6, the cover foil 5 is welded or sealed to the base foil 1 along predetermined seal lines.

Figure 2:
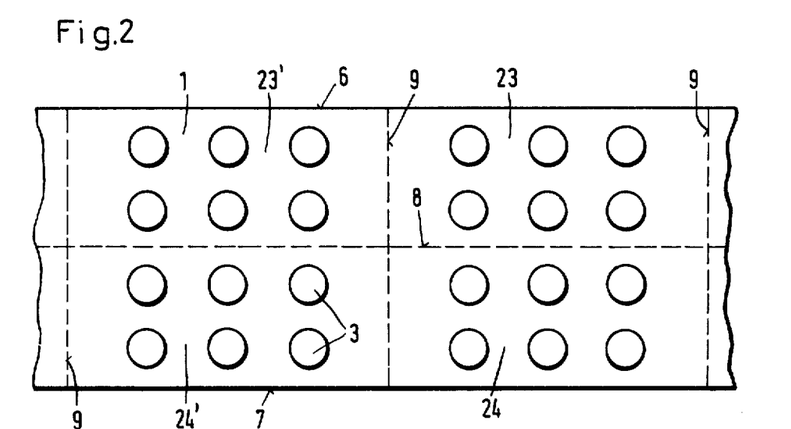
FIG. 2 is a view of the transported strip of compartments, facing the bottom foil.

FIG. 2 is a top view looking down upon a limited section of the strip of blister packages, i.e., the base foil 1 facing the viewer. The base foil 1 and cover foil 5 are sealed or welded to each other along the lateral edges 6 and 7, along the longitudinal centerline 8, and along the transverse seal lines 9. In FIG. 2, each blister package 23, 23', 24, 24' contains six compartments, and the blister packages are transversely arranged in pairs, i.e., one encounters two six-compartment blister packages as one counts transversely. The strip of blister packages is cut down the centers of the seal lines 8 and 9 at a cutting station 10 (FIG. 1). The individual six-compartment blister packages are then transported through a (non-illustrated) sorting station, where improperly filled blister packages are ejected. The properly filled blister packages are then transported to a packing station, where they are packed, for example into cartons.

As shown in FIG. 1, at a location upstream of where the cover foil 5 is applied to the base foil 1, there is arranged a T.V. camera 11. T.V. camera 11 is used to automatically determine whether the compartments 3 have been properly filled. If one or more compartments 3 of a particular six-compartment blister package is not properly filled, the system connected to the output of camera 11 (described below) causes an eject signal to be applied to the (non-illustrated) ejection means at the downstream sorting station, so that the improperly filled blister package can be sorted out.

T.V. camera 11 produces at its output a television signal BAS. This signal is applied to a pulse-separating stage 12, which separates out from the signal the horizontal synch or line pulses Z of the signal and transmits these Z pulses to a synchronizer unit 13.

Synchronizer unit 13, in synchronism with the receipt of horizontal synch pulses Z, applies trains of write-in and read-out rate control pulses to a memory 15, via the line connecting synchronizer unit 13 to memory 15. At its right-hand output, synchronizer 13 transmits horizontal synch pulses Z, and also the write-in and read-out rate control pulses, for purposes explained below. The horizontal synch pulses Z and the write-in and read-out rate control pulses transmitted from the right-hand output of synchronizer 13 conveniently differ in amplitude, so that they may be distinguished.

The write-in and read-out rate control pulses are transmitted from synchronizer unit 13 to the right input of a comparator unit 16, and serve as enabling pulses, enabling the performance of comparisons between the signals applied at the "+" and "−" inputs of comparator unit 16. The "+" input of comparator unit 16 is in receipt of the T.V. signal from the output of camera 11.

The picture information generated by camera 11 during one image period is stored in memory 15, for use as a standard or reference for comparison purposes. The camera picture signal is transmitted to the input of an analog-to-digital converter 14, which converts the picture information into digital signals, on a consecutive basis, i.e., point by point along successive image lines. This digitalized picture information is transmitted from the output of converter 14 to the input of memory 15, and written-in under the control of synchronizer unit 13. A control unit 18 is used to establish the write-in and read-out operating modes of memory 15. When it is desired that the picture information in one image period of camera 11 be registered in memory 15, for use as a standard for comparison purposes, the operator activates switch 19. This causes the write-in/read-out selector 18 to effect erasure of any picture information currently registered by memory 15, followed by the write-in of the digitalized picture information of one image-period of operation of camera 11, followed by a conversion to the read-out mode, after which the digitalized picture information registered in memory 15 is repeatedly read out. Memory 15 is preferably a circulating memory.

The digitalized picture information read out from memory 15 is transmitted to a digital-to-analog converter 17, which reconverts the digitalized picture information into analog form. The analog output signal of converter 17 is applied to the "−" input of comparator unit 16. Thus, after the picture information of a "standard" or "reference" image has been registered by memory 15, comparator 16 continually compares the picture information furnished by camera 11 during subsequent image-periods of its operation against the picture information of the memorized reference image registered by memory 15. The comparison takes place on a point-for-point basis; i.e., the instantaneous values of the picture signal from camera 11 are compared against the instantaneous values of the output signal from digital-to-analog converter 17, the comparisons occurring in synchronism with the read-out of memory 15, because the comparator unit 16 is enabled for comparing operation by the read-out rate control pulses transmitted thereto from synchronizer unit 13. Discrepancies between the instantaneous values of the two signals being compared lead to the generation of an error signal at the output of unit 16.

Figure 5:
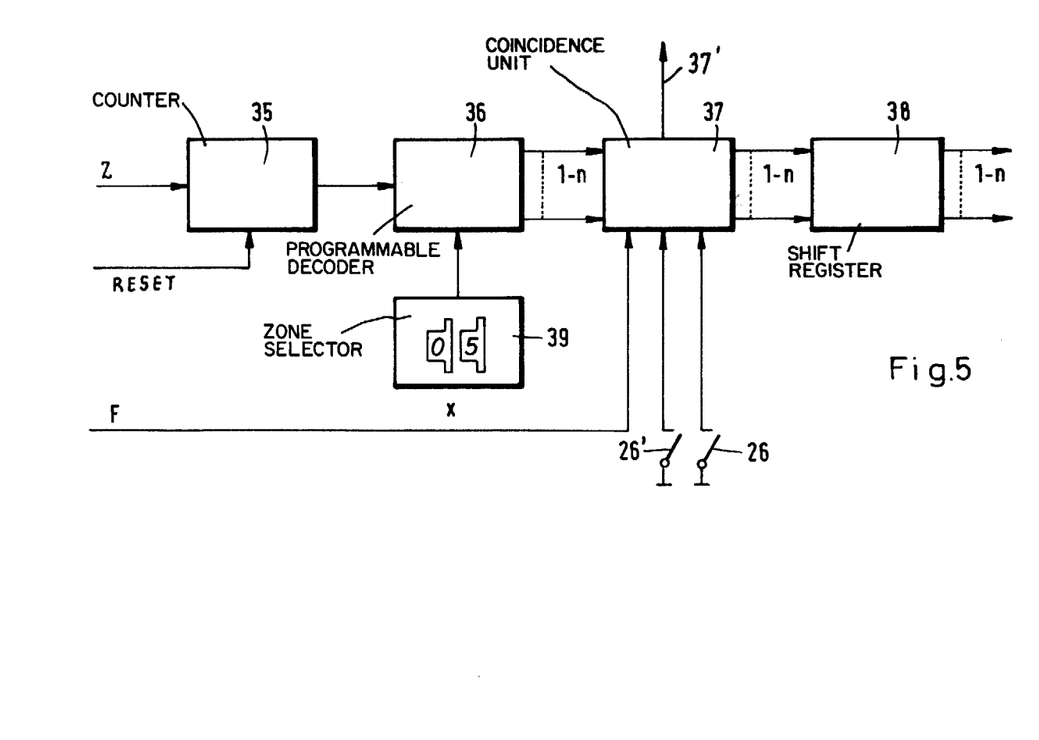
FIG. 5 is a circuit diagram of a first version of the gating circuit 20 of FIG. 1.
Figure 6:
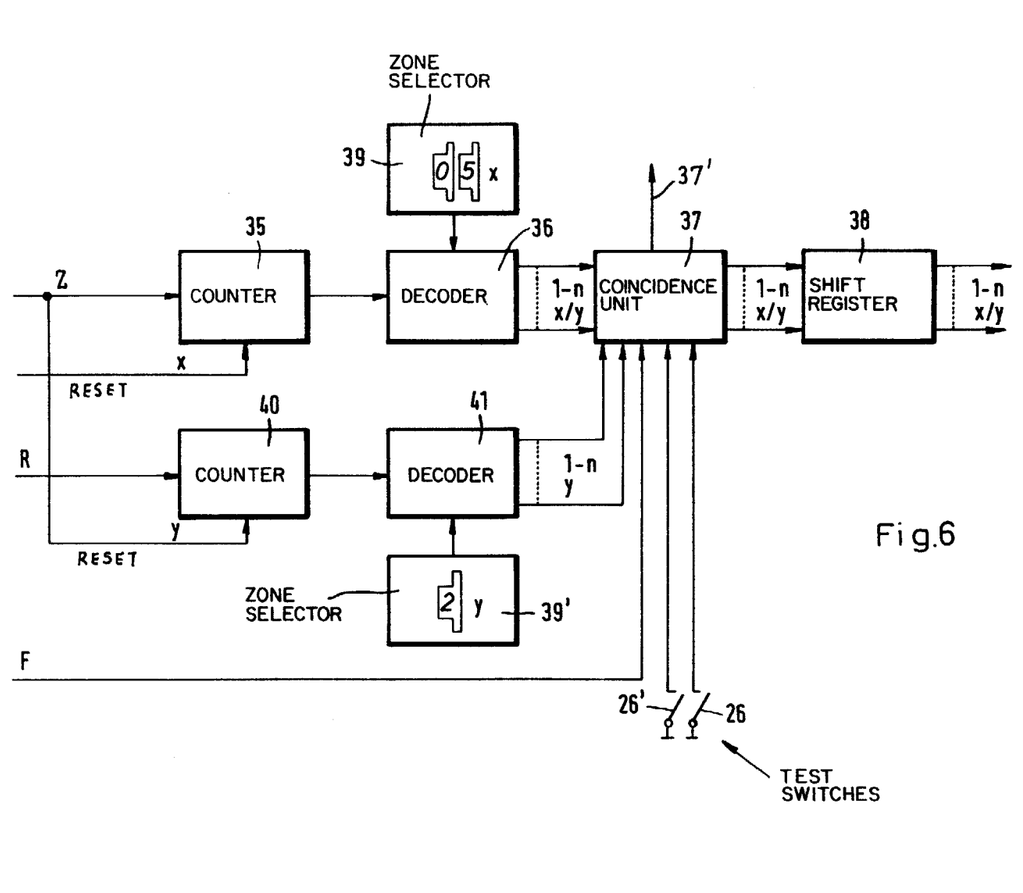
FIG. 6 is a circuit diagram of a second version of the gating circuit 20 of FIG. 1.

The error signals produced at the output of comparator unit 16 are transmitted to a gating circuit 20 (illustrated in a very schematic way in FIG. 1, but shown in detail in FIGS. 5 and 6). Also, gating circuit 20 receives horizontal synch pulses Z and read-out rate control pulses from the synchronizer unit 13, for purposes explained below. Gating circuit 20 is enabled in synchronism with the intermittent or continuous transport of the strip of blister packages, in a manner described below.

Figure 3:
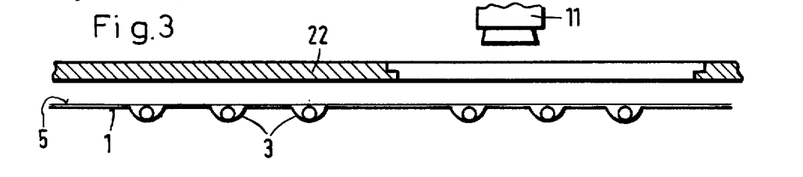
FIG. 3 is a sectional view through a strip of uncut blister packages comprised of filled compartments, and through a masking frame located between the strip and the camera of the testing system.

In the exemplary situation depicted in FIG. 3, the camera 1 forms an image of only one transverse row of blister packages. Here, a transverse row of blister packages consists of two six-compartment blister packages, e.g., 23 and 24 in FIGS. 2 and 3. To this end, there is arranged between the strip of blister packages and the T.V. camera 11 a field-of-view framing mask 22, which frames for viewing by camera 11 only the two blister packages 23 and 24. The following transverse rows of blister packages (23', 24'; 23'', 24''; etc.) are blocked from the camera's view. The same applies to transverse blister package rows preceding the transverse row of blister packages 23, 24.

To set-up the testing system for operation, the operator transports a transverse row of properly filled blister packages 23, 24 into the testing position, i.e., framed within masking frame 22. He then activates'switch 19. If memory 15 has previously registered the digitalized picture information of an earlier reference image, this information will be erased. Thereafter, during one image-period of operation of camera 11, the image information produced by camera 11 is digitalized by unit 14 and written-in into memory 15. Next, control unit 18 sets the memory 15 for read-out operation. During all successive image-periods of operation of camera 11, the picture information generated by camera 11 during each image period is continually compared against the picture information of the memorized reference image, by means of comparator unit 16. After the picture information of the reference image has been memorized, the packaging machine is started, the transport of the strip of blister packages commences. During the time interval within which the next-following pair of blister packages 23', 24' is moving to the testing position within the frame of mask 22, the picture information generated by camera 11 will of course differ very greatly from the picture information of the memorized reference image. Accordingly, during this intermediate time interval (i.e., the time interval between two testing operations), comparator unit 16 will produce a considerable number of error signals. These are transmitted to the gating circuit 20. However, the gating circuit 20 is enabled in synchronism with blister package strip transport, so that an error signal does not lead to the generation of an eject signal for the (non-illustrated) sorting unit, unless the error signal is generated at a moment when the blister package pair responsible for the error signal is exactly at the testing location. When the blister package pair to be tested does reach the testing location, the picture information generated by camera 11 at this time will be in principle identical to the picture information of the memorized reference image, if the containers of the blister package pair being examined are properly filled. Accordingly, the comparator unit 16 will not produce an error signal during the testing time interval, and no eject signal will be generated. In contrast, if one or more of the twelve compartments 3 of the blister package pair is not properly filled, there will be a discrepancy between the picture information generated by camera 11 during the testing interval and the picture information of the memorized reference image.

As a result, comparator unit 16 will generate an error signal during the testing time interval, and this will lead to the generation of an eject signal, commanding that the downstream sorting unit sort out the improperly filled unit. Practical considerations, relating to what degree of discrepancy relative to the reference image should produce an error signal, are discussed further below. Preferably, the eject signal is generated in immediate response to an error signal produced during the testing time interval, but time-delay means (such as a time-delay shift register driven in synchronism with blister package transport) is utilized to delay the application of the eject signal to the sorting unit until the improperly filled unit actually arrives at the sorting unit.

In the simplest case, if only one of the blister packages contains an improperly filled container 3, the whole transverse row of blister packages is ejected at the sorting station and discarded. Thus, in the illustrative example, where the transverse row of blister packages consists of only two blister packages (23', 24'; 23'', 24''; etc.), this involves the wasteful discarding of at most one blister package. On the other hand, this expedient is relatively simple, in the sense that the picture information of the two images being compared need not be analyzed and correlated with the individual packages of a transverse row of packages.

Furthermore, when an entire transverse row of packages is to be sorted out, the orientation of the scanning lines of the camera tube relative to the transport direction of the packages (i.e., perpendicular to each other or parallel to each other) is not particularly important.

However, where the transverse row of blister packages consists of a larger number of packages, it may be uneconomical to eject and discard the entire row when only one package is actually defective. In that event, it may be desired to analyze the picture information in the images being compared, and correlate the analyzed information with respect to individual blister packages in the transverse row of packages. FIG. 5 depicts an embodiment of the gating circuit 20 of FIG. 1, capable of ascertaining exactly which one of the packages in a transverse row of packages is the one not properly filled.

The gating circuit shown in FIG. 5 comprises a counter 35, a programmable decoder 36 having n outputs, a coincidence unit 37 and a shift register 38.

The counter 35 accepts and counts the line pulses Z furnished at the right output of synchronizer unit 13, and accordingly keeps a running count of which image line of the reference image stored in memory 15 is being read out at any given moment. When the last image line of the reference image has been counted, counter 35 becomes reset, either automatically (i.e., by internal means responsive to the count-number of the last image line in an image) or else by a reset pulse applied to its illustrated reset input. Persons skilled in the art will understand that such a reset pulse can be readily derived from the end-of-image pulses (e.g., the vertical synch pulses) of the T.V. signal produced at the output of camera 11, as one example.

Programmable decoder 36 is operative for receiving the count on counter 35 and correlating the count with an individual one of the blister packages in a transverse row of blister packages. It is assumed, for simplicity, that the camera tube of camera 11 is so oriented that its scan lines extend parallel to the transport direction of the strip of blister packages. Selector unit 39 is settable by the operator, to establish the sectors into which the T.V. image is to be subdivided, for correlation with the individual packages in a transverse row of packages. Thus, if, as in FIGS. 2 and 3, there are two packages in a transverse row of packages, the operator sets selector unit 39 to its "2" setting. This programs decoder 36 to distinguish between the line numbers of image lines located in the upper half of the T.V. image and the line numbers of image lines located in the lower half of the T.V. image. For this case (i.e., the T.V. image is divided into two halves) only the first and second outputs of the n outputs of decoder 36 are utilized. If the line count on counter 35 corresponds to an image line in the upper half of the T.V. image, a signal is produced on the first output of decoder 36; if the line count on counter 35 corresponds to an image line in the lower half of the T.V. image, a signal is produced on the second output of decoder 36. For this case (i.e., selector unit 39 in its "2" setting), the third through nth outputs of decoder 36 (and the corresponding outputs and inputs of unit 37 and register 38) are not utilized.

(If selector unit 39 is set to its "3" setting, because the transverse row of packages contains three packages, then in an analogous manner, decoder 36 will be utilized to correlate the line count on counter 35 with the upper, middle or lower third of the T.V. image, and the first three of the n outputs of decoder 36 will be utilized.)

Thus, during each comparison of the image information from camera 11 against the memorized image information, decoder 36 applies the coincidence unit 37 a signal indicating whether the image information being compared belongs to the upper halves of the two images, or to the lower halves of the two images.

Coincidence unit 37 is provided with an input for receipt of error signals F from the output of comparator unit 16, and two control inputs which receive synchronizing signals from synchronizing switches 26 and 26'. Additionally, coincidence unit 37 is provided with n outputs, corresponding to the n outputs of decoder 36. These n outputs are connected to n inputs of an n-branch shift register 38 (i.e., n parallel shift registers driven in synchronism). Also, coincidence unit 37 is provided with an output 37' for the transmission of error signals to a shut-off device, under certain circumstances explained below.

Synchronizing switch 26 closes when the transverse row of packages to be tested (e.g., 23', 24') has moved exactly into the testing position. When switch 26 is closed, an error signal F (if any) applied to the input of coincidence unit 37 is transmitted to one of the n outputs of unit 37; in particular, the error signal F will be transmitted to that one of the n outputs of 37 corresponding to the one of the n inputs of 37 currently in receipt of a signal from decoder 36.

The error signal F (if any) appearing on the first or second output of coincidence unit 37 is applied to the corresponding one of the first and second information-signal inputs of the n-branch shift register 38. At the end of the testing operation, switch 26 opens, and the error signal F (if any) at the output of unit 37 disappears.

The error signal F (if any) registered by the shift register 38 is then transmitted through the shift-register stages thereof in synchronism with the transport of the tested transverse row of packages towards the (non-illustrated) sorting unit, and the error signal F reaches the output stage of shift register 38 as the tested transverse row actually reaches the sorting unit. Then, depending upon whether the error signal F appears on the first or second output of the last shift-register stage, the sorting unit ejects one or the other of the two packages in the transverse row (e.g., 23' or 24'), as the case may be.

The shift pulses required to drive shaft register 38 are generated and applied thereto in synchronism with strip transport. The shift pulses can, for example, be derived from the synchronizing switch 26 itself, or by other and conventional means, e.g., a synchronizer coupled to and driven by the strip transport drive means, etc. If the strip is intermittently transported, the shift pulses required to drive shift register 38 can be derived directly from the transport command signals of the intermittent transport mechanism, for example.

The sorting station and the ejecting means thereof are not illustrated, because they do not per se form novel features of the invention. If the sorting unit is permanently set up for handling strips of blister packages in which each transverse row of packages contains two and only two packages, then of course the flexibility of the illustrated testing system with respect to the number of packages in a transverse row is not utilized, but the system would then be capable of use with other sorting units capable of handling strips of different organization. If the sorting unit is adjustable, to handle strips whose transverse rows of packages contain a variable number of packages, then of course the flexibility of the illustrated testing system will be utilized.

When the testing operation is completed, and the next transverse row of packages (e.g., 23", 24") is being transported to the testing location, switch 26 is open, and therefore error signals F applied to the input of coincidence unit 37 cannot be transmitted to the outputs thereof, and accordingly eject or discard signals will not be produced. It will be appreciated that, when the next row of packages to be tested is moving towards the testing location, the discrepancy between the information of the images compared by comparator unit 16 will be very considerable, certainly leading to the generation of error signals F. This fact is exploited, in the illustrated system, to create a monitoring feature, for monitoring the operativeness of the system. At a time between two successive testing operations at which the discrepancy between the images being compared is certain to be high, synchronizer switch 26' closes for a brief time interval. As a result, the error signals F which are certain to be applied to the input of coincidence unit 37 if the system is operated properly, become transmitted to the output 37' thereof. The appearance of such error signals F at output 37' during this intermediate time interval, evidences that the system is operating properly. If no error signals F appear at output 37' during this intermediate time interval, this is a clear indication that a malfunction has developed.

As explained above, the embodiment of the gating circuit 20 of FIG. 1 shown in FIG. 5 can be used when, during one testing operation, a single transverse row of packages is examined, and it is desired to be able to identify which package in the transverse row is improperly filled. If it is desired to examine, during one testing operation, more than one transverse row of packages, then the images to be compared must be further subdivided, in order to correlate error signals with transverse rows and also longitudinal rows, i.e., in order to be able to single out the improperly filled or unfilled package. FIG. 6 depicts an embodiment of the gating circuit 20 of FIG. 1 having this greater capability.

In the embodiment of FIG. 6, the counter 35, the decoder 36, the selector 39, and shift register 36, and the test switches 26 and 26' operate exactly as in the embodiment of FIG. 5. However, use is made of an additional counter 40, an additional decoder 41, and the coincidence circuit 37 has an expanded capability.

If for example, a two-by-two group of four blister packages is examined in a single testing operation, then it is necessary to distinguish between the two transverse rows being examined. This is accomplished by components 39', 40 and 41.

Selector 39' is used to select the number of transverse rows to be examined during a single testing operation. For example, if two rows are to be examined, selector 39'' is set to its "2" setting, to divide the images being compared into left and right halves.

Counter 40 receives at its counting input the read-out rate control pulses R generated by synchronizer 13. Principally, these read-out rate control pulses are used to effect linewise read-out of storage 15 in response to successive line pulses Z received by synchronizer 13. Additionally, as already explained, the read-out rate control pulses Z are applied to the enablement input of comparator 16, to synchronize its comparison operations with the read-out of storage 15. In FIG. 6, the read-out rate control pulses R are furthermore utilized to determine which single transverse row of packages is responsible for a generated error signal F. The count on counter 40 at any given moment indicates, for an error signal generated at such moment, the point along the line being scanned to which the error signal in question is attributable.

The decoder 41 continually receives the count from counter 40, and produces an output signal indicative of which transverse row is being examined at any given instant. If selector 39' is in its "2" setting, to program decoder 41 for differentiation between two transverse rows, only the first and second outputs of decoder 41 are utilized. A signal appears on the first output of decoder 41 whenever points in the left halves of the two images are being compared; a signal appears on the second output of decoder 41 whenever points in the right halves of the two images are being compared. Counter 40 is reset at the end of each line scan, by means of the next line pulse Z for the next line scan.

Thus, at any given instant, coincidence unit 37 receives from decoder 36 a signal correlating the image-points being compared with one of the longitudinal rows of packages, and receives from decoder 41 a signal correlating the image-points being compared with one of the transverse rows of the packages, thereby correlating the image-points being compared with a single one of the packages.

Test switch 26 closes when the group of packages to be tested arrives at the testing location. During the testing interval, any error signal F which is generated is correlated with a single package within the group of packages. At the end of the testing operation, test switch 26 is opened, and transport of the strip of packages continues. An error signal (if any) attributable to one of the transverse rows appears at the first or second output of 37, and is registered by the shift register 38, and the shift register 38 is shifted; thereafter, an error signal (if any) attributable to the next of the just-tested transverse rows appears at the first or second output of 37, is registered by the shift register 38, and the shift register 38 is shifted again.

Thus, in the FIG. 6 embodiment, error signals are applied to the shift register 38 in substantially the same way as in FIG. 5. The difference is that in FIG. 5 a single transverse row of packages is tested during one testing operation, whereas in FIG. 6 a plurality of transverse rows of packages can be tested during one testing operation.

Figure 5A:
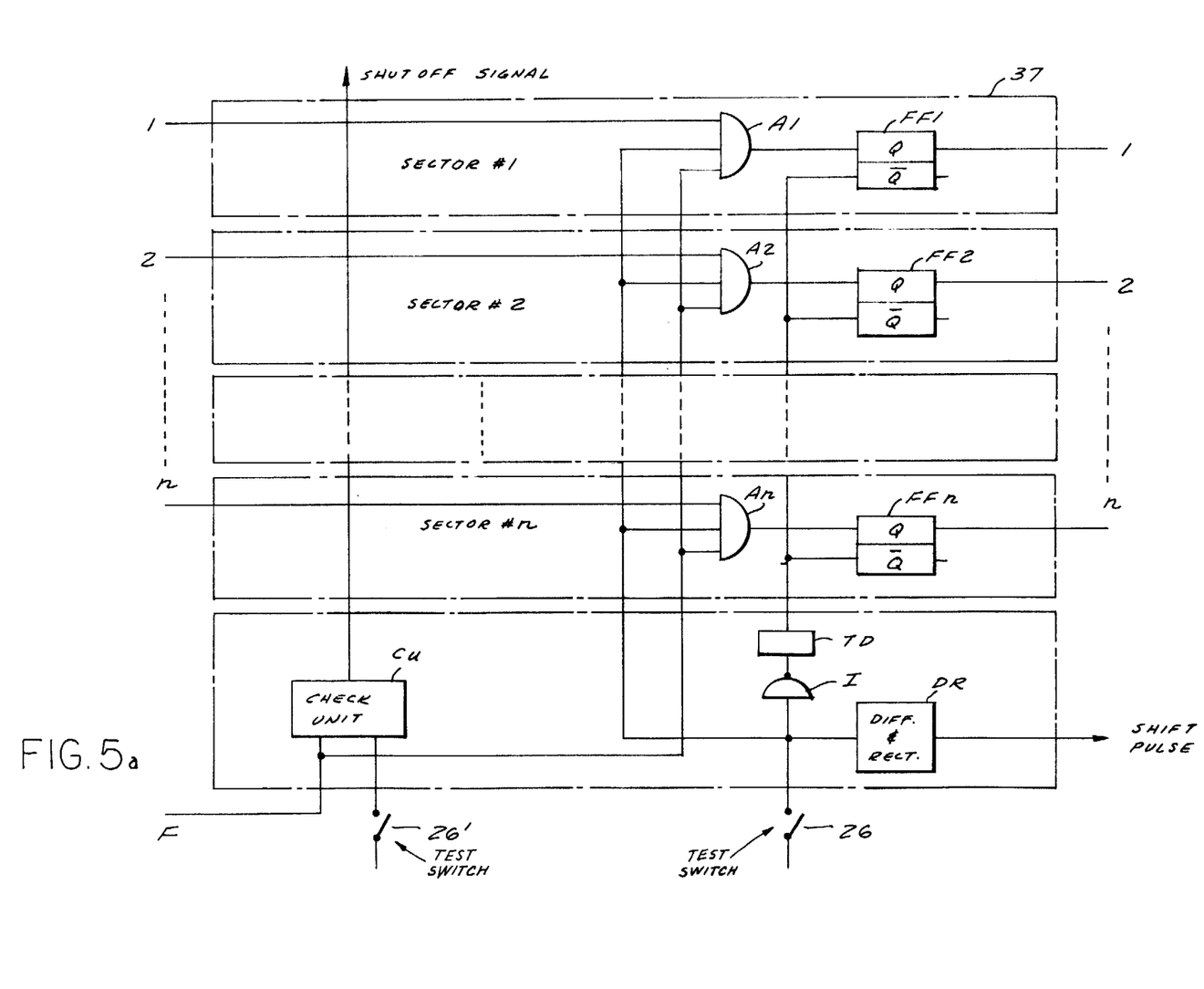
FIGS. 5a and 5b are circuit diagrams illustrating the circuitry contained within the coincidence unit 37 of FIG. 5.

An exemplary version of the coincidence unit 37 used in the FIG. 5 embodiment is depicted in FIG. 5a. Unit 37 has n inputs and n outputs, and is divided into n sectors, of which only the first, second and nth are shown. Each input of 37 is connected to the corresponding output thereof via respective AND-gate A1, A2, ..., An. The first input of each AND-gate receives the signal applied from decoder 36. The second inputs of these AND-gates are all connected to receive a "1" signal when test switch 26 closes. The third inputs of these AND-gates are all connected for receipt of error signals F. When test switch 26 is closed, an error signal F applied to the input of unit 37 is transmitted to the output of only one AND-gate, the one receiving a signal from the output of decoder 36.

The output of each AND-gate is connected to the corresponding output of unit 37 via a respective flip-flop FF1, FF2, ..., FFn. These flip-flops are needed, because during a single testing operation, an error signal may repeatedly appear and disappear at the output of each of the AND-gates. Therefore, it is necessary that, as soon as an error signal appears at the output of an AND-gate, the error signal be stored during the remainder of the testing operation, to assure that, at the end of the testing operation, the shift register 38 will actually register an error signal.

At the end of the testing operation, switch 26 opens. A differentiator-and-rectifier unit DR responds to the change of switch 26 from closed to open position, and generates a shift pulse for shift register 38. Thus, the error signals (if any) applied to and registered by the input stage of the shift register are shifted by one stage, so that the input stage of the register will be readied for possible receipt of new error signals during the next testing operation.

Also, when switch 26 opens at the end of the testing operation, a "1" signal appears at the output of an inverter I and is transmitted, via a time-delay stage TD, to all the flip-flops, thereby erasing all stored error signals, in preparation for the next testing operation. The time-delay stage TD is utilized to slightly delay the erasure of stored error signals, to assure that these are not erased until after shift register 38 has performed its shift.

The coincidence unit 37 shown in FIG. 5a also includes a check unit CU, connected to receive error signals F and a signal from check switch 26′, and provided with an output 37′ at which it can generate a shutoff signal, to command shutoff of the entire packaging machine, upon detecting of malfunction.

Figure 5B:
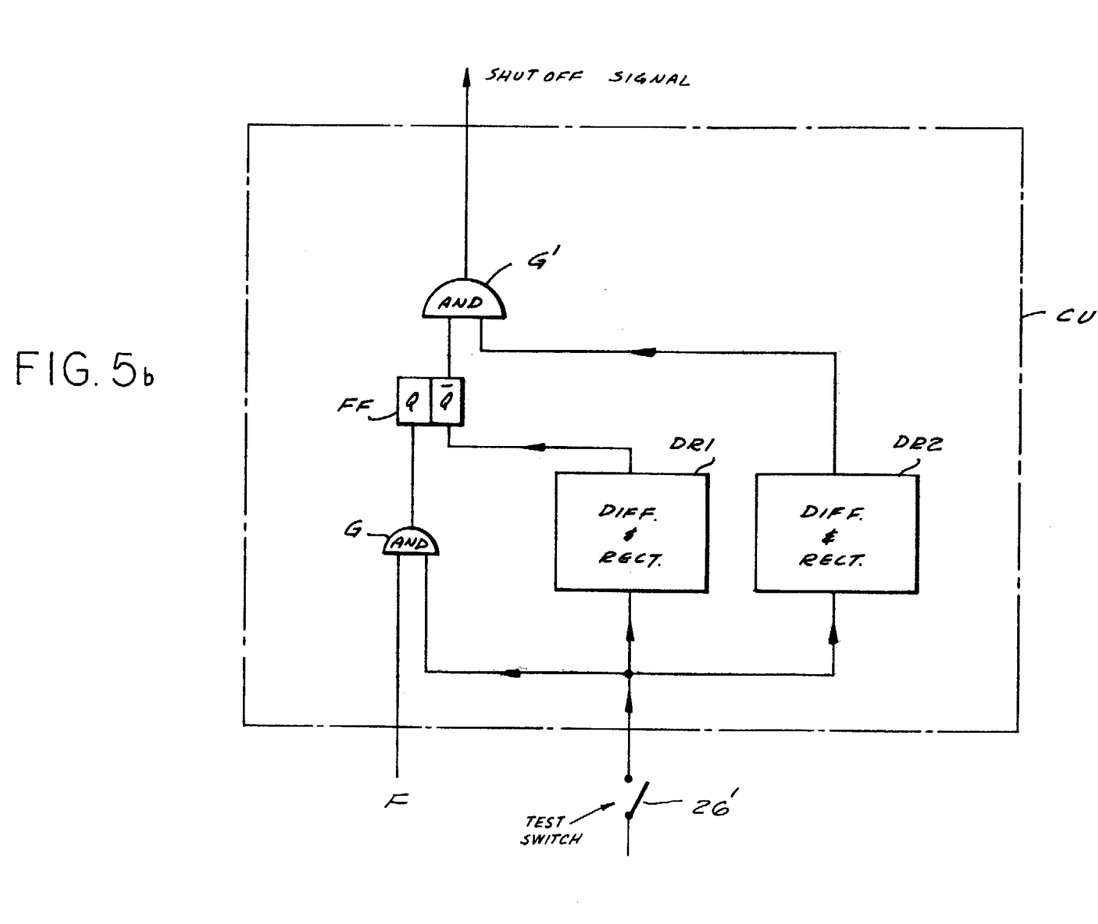

An exemplary circuit for check unit CU is shown in FIG. 5b. Check switch 26′ is closed between two successive testing operations, when the next package or group of packages to be tested is moving towards the testing location. When check switch 26′ is closed, AND-gate G can transmit received error signals F to its output. If one or more error signals F are transmitted to the output of AND-gate G while check switch 26′ is closed, an error signal becomes registered by a flip-flop FF. At the end of the check operation, check switch 26′ is opened. A differentiator-and-rectifier stage DR2 senses the change of switch 26′ from closed to open position, and applies to AND-gate G′ a brief enabling pulse. If, during this check operation, flip-flop FF failed to register an error signal F, then at this point (i.e., at the moment switch 26′ is opened), a shutoff signal appears at the output 37′ of AND-gate G′. This shutoff signal is used to shut down the entire packaging machine, because the absence of error signals during the intermediate time intervals (when the images being compared exhibit a great discrepancy) indicates a malfunction in the testing system.

Figure 6A:
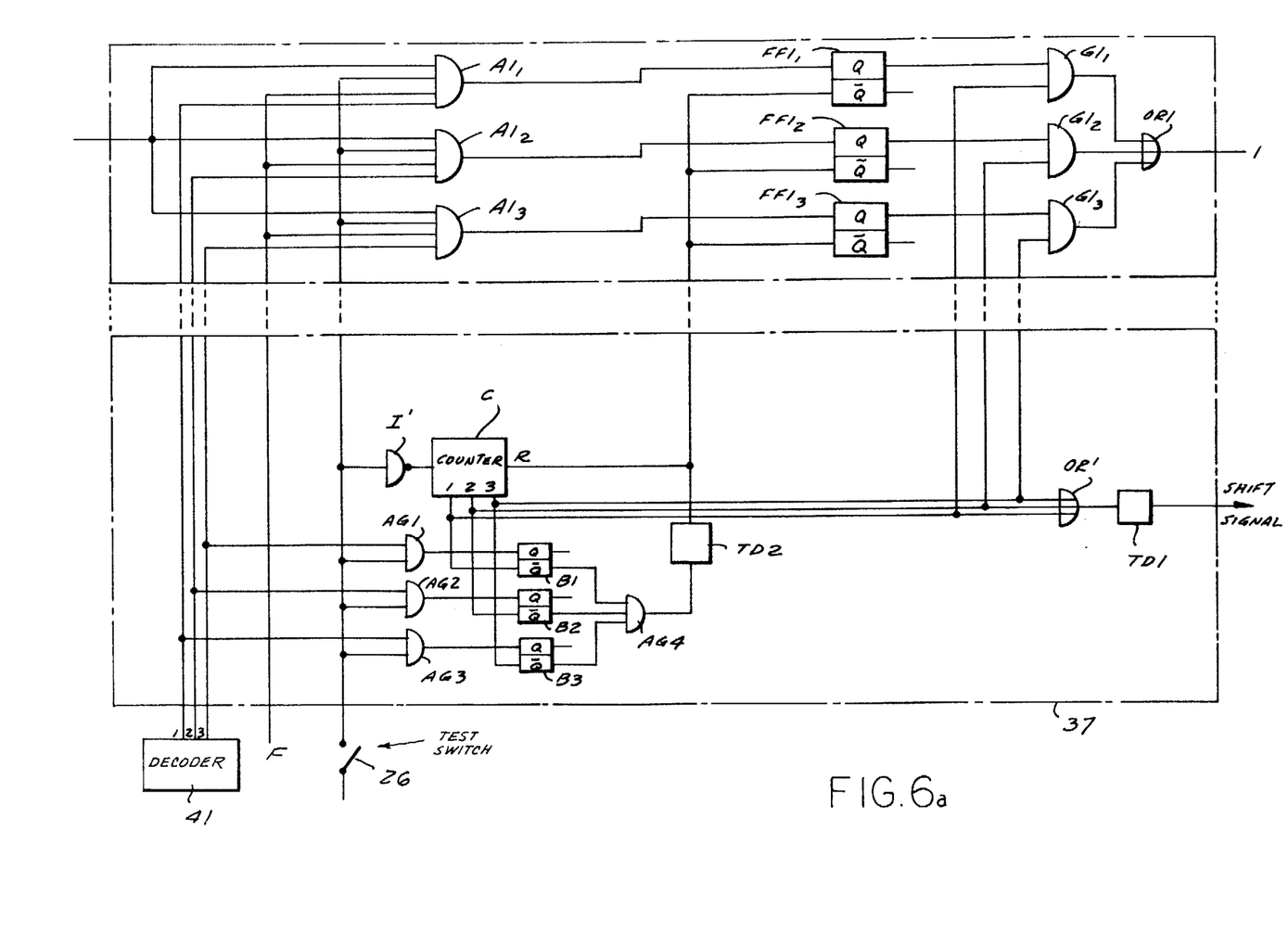
FIG. 6a is a circuit diagram illustrating the circuitry contained within the coincidence unit 37 of FIG. 6.

A circuit diagram for the version of coincidence unit 37 utilized in the embodiment of FIG. 6 is depicted in FIG. 6a. Again, unit 37 has n sectors, with n inputs and n outputs; however, only the first sector, for the first input and first output of unit 37, is shown.

The AND-gate A1 of the first sector in FIG. 5a is here replaced by a set of three AND-gates $A1_1$, $A1_2$, $A1_3$. The first input of each AND-gate in the set is connected to the first input of unit 37. The second input of each AND-gate in the set is connected to test switch 26. The third input of each AND-gate is connected to receive error signals F. The fourth input of each AND-gate is connected to a different respective one of the outputs of decoder 41. (It is assumed, for simplicity, that decoder 41 has only three outputs, meaning that no more than three transverse rows of packages can be tested during a single testing operation.) The output of each AND-gate $A1_1$, $A1_2$, $A1_3$ is connected to the first input of a respective flip-flop $FF1_1$, $FF1_2$, $FF1_3$. The first outputs of these flip-flops are connected to the first output of unit 37, via AND-gates $G1_1$, $G1_2$, $G1_3$ and an OR-gate OR1.

At the start of the testing operation, test switch 26 is closed, thereby applying a "1" signal to the second input of each AND-gate $A1_1$, $A1_2$, $A1_3$. Each of these AND-gates receives all generated error signals F. However, an error signal applied to the input of any one of these AND-gates can be transmitted to the output thereof, only if the first input of unit 37 is in receipt of a "1" signal from decoder 36 and, concurrently therewith, the AND-gate is receiving a "1" signal from the associated one of the outputs of decoder 41.

If selector 39′ has been set two its "2" setting, for the simultaneous testing of two transverse rows of packages, then a "1" signal will alternately appear on the first and second outputs of decoder 41; thus, only the first and second AND-gates $A1_1$, $A1_2$ will actually be utilized. Assuming that the group of packages consists of a two-by-two group of four, an error signal F can be transmitted to the output of AND-gate $A1_1$ only when the error signal is attributable to the upper right package; likewise, an error signal F can be transmitted to the output of AND-gate $A1_2$ only when the error signal is attributable to the upper left package.

Whenever an error signal F appears at the output of one of AND-gates $A1_1$, $A1_2$, $A1_3$, it becomes registered by the associated one of flip-flops $FF1_1$, $FF1_2$, $FF1_3$ for the remainder of the testing operation.

During the testing operation, unit 37 registers information per se indicative of the number of transverse rows being examined. This is accomplished by a set of three AND-gates AG1, AG2, AG3 and three flip-flops B1, B2, B3. The first input of each of these AND-gates is connected to a respective one of the outputs of decoder 41. The second inputs of all these AND-gates are connected for enablement by test switch 26. Thus, during the testing operation, if only two transverse rows of packages are being tested, a "1" signal will alternate between the first and second outputs of decoder 41, and thus only the first and second flip-flops B1, B2 will become set. If three transverse rows of packages are being tested then, at different times, a "1" signal will appear on each of the first, second and third outputs of decoder 41, and all three flip-flops B1, B2, B3 will become set.

At the end of the test operation, switch 26 is opened. This renders AND-gates AG1, AG2, AG3 nonresponsive to further signals from decoder 41. When switch 26 opens, the "0" signal at the output of an inverter I converts to a "1" signal. This "0" to "1" transition triggers a step-by-step counter C, and counter C commences to count, producing a "1" signal on successive single ones of its outputs. The "1" signal on the first counter output enables gate $G1_1$ to transmit the error signal (if any) stored by flip-flop $FF1_1$ to the first output of unit 37, for registration by shift register 38. Also, the "1" signal on the first counter output is transmitted, via an OR-gate OR′ and a time-delay stage TD1, to the output of unit 37, for use as a shift pulse to shift the shift register 38. Time-delay stage TD1 slightly delays the shifting of the shift register, to assure that before the shift occurs the input stage of the register has actually registered the error signal F (if any) at the first output of unit 37.

The output "1" signal of counter C now shifts from the first to the second output of the counter. Consequently, gate $G1_2$ becomes enabled, and transmits to the first output of unit 37 the error signal F (if any) registered by its flip-flop $FF1_2$, and shortly thereafter a shift pulse is produced at the output of time-delay stage TD1.

If three transverse rows of packages were being tested, then the output "1" signal of counter C would shift from the second to the third output of the counter; however, this does not occur here, because of the assumption that only two transverse rows of packages are involved. Because only two transverse rows are involved, only the first and second flip-flops B1, B2 are in the set state; third flip-flop B3 was not set during the testing operation. The appearance of a "1" signal on the first output of counter C resets first flip-flop B1. The appearance of a "1" signal on the second counter output resets second flip-flop B2. At that point, all flip-flops B1-B3 are in their reset state, and the output "0" signal of an AND-gate AG4 converts to a "1" signal. This "0" to "1" conversion is transmitted to the reset input R of counter C, via a time-delay stage TD2, and counter C becomes reset (all its outputs carry "0" signals). The time-delay stage TD2 assures that the resetting of counter C does not occur until after the error signal F (if any) registered by $FF1_2$ has been transmitted to the shift register and the shift register actually shifted. The just-mentioned "0" to "1" conversion at the output of AND-gate AG4 is also transmitted to the reset inputs of the flip-flops $FF1_1$, $FF1_2$, $FF1_3$, and erases all error signals F (if any) registered by these flip-flops, in preparation for the next testing operation. The counter C cannot again count, until the next time the test switch 26 is opened, i.e., at the end of the next testing operation.

The counter C may include an internal pulse generator which supplies the pulses to be counted at a rate corresponding as closely as possible to the package transport speed; or, for better synchronism, the pulses to be counted can be applied to the counter by an electromechanical synchronizer, synchronized with package transport, during package transport subsequent to the opening of test switch 26.

The checking unit CU shown in FIG. 5a is likewise to be included in the version of the unit 37 shown in FIG. 6a.

In the embodiments described above, the camera tube of the T.V. camera 11 is so oriented that its scan lines extend parallel to the transport direction of the strip of packages.

In the system described above, the two images being compared (or their halves or quadrants, etc.) are compared on a point-for-point basis. Thus, if even two corresponding image points on the two images being compared exhibit a discrepancy, then in principle comparator 16 will produce an error signal F. To prevent the generation of error signals resulting from small imperfections in the degree of "register" achieved between the two images being compared, various techniques can be employed. A very simple expedient is to adjust the image definition of the T.V. camera 11 to a value lower than would be used for normal T.V. purposes, by somewhat defocussing the scanning electron beam of the camera tube. Thus, if the edges of two corresponding containers in the two images being compared are not in perfect register, the somewhat defocussed scanning beam will inherently compensate for this and not produce improper error signals. However, when image points in, for example, the centers of two corresponding containers in the two images are compared, the defocussing of the scanning beam will not prevent sensitive detection of image discrepancies. Instead of defocussing the scanning beam, or in addition thereto, a threshold circuit can be included in the comparator 16, so that an error signal will be transmitted to the remainder of the circuitry only if the detected discrepancy exceeds a certain value. A further possibility is to include in the comparator 16 an integrator connected to the input of a threshold circuit, so that an error signal will be generated only in response to an image discrepancy extending over a spatial region greater than one image point.

We have found, in particular, that imperfect "registration" of the images being compared will often result from variations in the lengths of individual sections of the strip of packages. For example, if a constant transport tension is maintained, but certain sections of the foils constituting the strip of packages are of greater or lesser thickness, they will respectively tend to be shorter or longer. As one result, the distance between adjoining containers in the packages being tested may differ from the corresponding distance for the packages used to form the reference image.

Figure 4A:
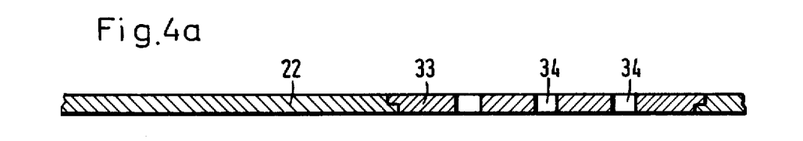
FIGS. 4a and 4b are sectional and top views of a masking frame accommodating an apertured masking plate.
Figure 4B:
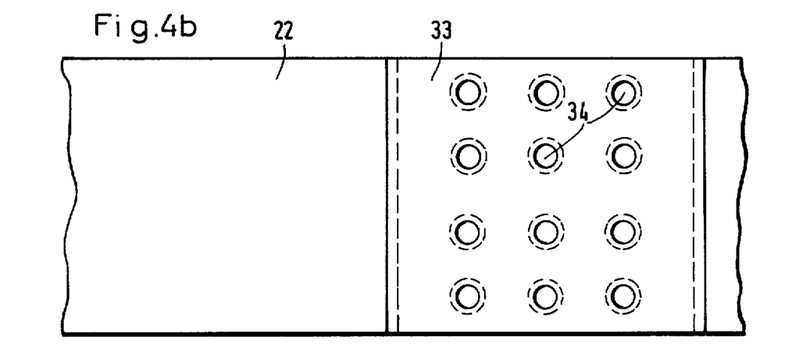

FIGS. 4a and 4b depict a mechanical solution to the problem of imperfect register between the images being compared. In FIGS. 4a and 4b, the framing window of framing mask 22 accommodates an apertured masking plate 33, provided with openings 34. These are so disposed that, when the packages to be tested are properly in position, their individual compartments 3 will be in register with the openings 34. Additionally, the openings 34 are of somewhat smaller dimensions than the compartments 3. For example, if the compartments 3 are circular, the openings 34 are circular but of smaller diameter. In that event, registration problems will not arise, so long as the variation in the spacing between adjoining compartments 3 does not exceed one half the difference between the diameters of 3 and 34. This is a particularly simple and reliable way of avoiding registration problems. Furthermore, the use of a removable apertured masking plate 33 makes for easy conversion from one type of package organization to another.

It will be understood that each of the elements described above, or two or more together, may also find a useful application in other types of circuits and arrangements differing from the types described above.

While the invention has been illustrated and described as embodied in a testing system for testing the filling of compartments of blister packages, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a system for testing the compartments of packages transported through a packaging machine to determine which compartments are not properly filled and sorting out the packages having the not properly filled compartments, in combination, means for transporting a succession of packages comprised of orderly groups of compartments along a predetermined path; a testing station located along the predetermined path, provided with a television camera operative for converting into a picture signal the image content of the pick-up images of each orderly group of compartments moved into the field of view of the camera; storage means for storing the image information contained in the picture signal produced by the camera during the pick-up of the image of one orderly group of properly filled compartments for use as reference image information; read-out means operative for repeatedly reading out the stored image information; comparing means operative for comparing the image information contained in the picture signal produced by the images of the orderly groups of compartments successively moved into the field of view of the camera against the repeatedly read out reference image information and operative for generating discard signals in respond to discrepancies between the compared image information, and zone-establishing means operative for generating zone-indicating signals indicating which zones within the whole video images constituted by a plurality of adjoining rows of adjoining zones are being compared at any given time, the comparing means including means responsive to the zone-indicating signals and operative for generating mutually distinguishable zone-referenced discard signals associated with respective individual ones of the zones of the complete images, thereby indicating what part of the orderly group of compartments located in the field of view of the camera contains at least one not-properly filled compartment, whereby to permit systematic discard of less than all the compartments of the orderly group of compartments located in the field of view of the camera.

2. The system defined in claim 1, furthermore including selecting means for selecting the number of zones which the zone-indicating signals are to indicate.

3. The system defined in claim 1, furthermore including selecting means for selecting the number of rows of zones and the number of zones within each individual row.

4. The system defined in claim 3, further including selecting means operable by the operator of the testing system for establishing the number of zones into which the decoding means subdivides the image picked up by the camera.

5. In a system for testing the compartments of packages transported through a packaging machine to determine which compartments are not properly filled and sorting out the packages having the not properly filled compartments, in combination, means for transporting a succession of packages comprised of orderly groups of compartments along a predetermined path; a testing station located along the predetermined path, provided with a television camera operative for converting into a picture signal the image content of the picked-up image of each orderly group of compartments moved into the field of view of the camera; storage means for storing the image information contained in the picture signal produced by the camera during the pick-up of the image of one orderly group of properly filled compartments for use as reference image information; read-out means operative for repeatedly reading out the stored image information; and comparing means operative for comparing the image information contained in the picture signal produced by the camera during the pick-up of the images of the orderly groups of compartments successively moved into the field of view of the camera against the repeatedly read out reference image information and operative for generating discard signals in response to discrepancies between the compared image information, the storage means including means for converting the image information in the picture signal produced by the camera into digitalized image information, a storage, and means for converting digitalized image information read out from the storage into reconstituted analog image information, the read-out means comprising synchronizing means operative for receiving the horizontal synch signals in the picture signal produced by the camera and in synchronism therewith effecting readout of the digitalized image information from the storage, the comparing means including means for synchronously comparing the picture signal produced by the camera against the reconstituted analog information and in response to discrepancies between the picture signal and the reconstituted analog information generating error signals, and gating means receiving the error signals and operative when enabled for transmitting received error signals to form the discard signals, and means for enabling the gating means in synsynchronism with the transport of successive packages through the testing station, the gating means including means operative during each read-out of the information corresponding to one image line for furnishing during the course of the read-out a series of synchronizing pulses, counting means receiving the series of synchronizing pulses and operative for counting in dependence thereon, decoding means responsive to the count on the counting means and in dependence thereon producing zone-indicating signals indicating at any given time which zone of the image picked up by the camera is being compared against the image information being read out from the storage means, and means operative for correlating the error signals received by the gating means with the packages in a row of packages extending parallel to the camera-tube scan lines by correlating the error signals with the zone-indicating signals and in dependence upon the correlation generating the discard signals.

6. The system defined in claim 5, further including selecting means operable by the operator of the testing system for establishing the number of zones into which the decoding means subdivides the image picked up by the camera.

7. In a system for testing the compartments of packages transported through a packaging machine to determine which compartments are not properly filled and sorting out the packages having the not properly filled compartments, in combination, means for transporting a succession of packages comprised of orderly groups of compartments along a predetermined path; a testing station located along the predetermined path, provided with a television camera operative for converting into a picture signal the image content of the picked-up image of each orderly group of compartments moved into the field of view of the camera; storage means for storing the image information contained in the picture signal produced by the camera during the pick-up of the image of one orderly group of properly filled compartments for use as reference image information; read-out means operative for repeatedly reading out the stored image information; and comparing means operative for comparing the image information contained in the picture signal produced by the camera during the pick-up of the images of the orderly groups of compartments successively moved into the field of view of the camera against the repeatedly read out reference image information and operative for generating discard signals in response to discrepancies between the compared image information, the storage means including means for converting the image information in the picture signal produced by the camera into digitalized image information, a storage, and means for converting digitalized image information read out from the storage into reconstituted analog image information, the read-out means comprising synchronizing means operative for receiving the horizontal synch signals in the picture signal produced by the camera and in synchronism therewith effecting readout of the digitalized image information from the storage, the comparing means including means for synchronously comparing the picture signal produced by the camera against the reconstituted analog information and in response to discrepancies between the picture signal and the reconstituted analog information generating error signals, and gating means receiving the error signals and operative when enabled for transmitting received error signals to form the discard signals, and means for enabing the gating means in synchronism with the transport of successive packages through the testing station, the gating means including first counting means receiving horizontal synch pulses from the synchronizing means and operative for counting image lines of the image picked up by the camera, means operative during each read-out of the information corresponding to one image line for furnishing during the course of the read-out a series of synchronizing pulses, second counting means receiving the series of synchronizing pulses and operative for counting in dependence thereon, decoding means responsive to the counts of the first and second counting means and producing in dependence thereon x-coordinate and y-coordinate zone-indicating signals indicating at any given time which x-coordinate zone and which y-coordinate zone of the image picked up by the camera is being compared against the image information being read out from the storage means, to thereby identify the x-y sector being compared, and means operative for correlating the error signals received by the gating means with the packages in rows of packages extending both transverse and parallel to the camera-tube scan lines by correlating the error signals with the x-y sector defined by the indicated x-coordinate zone and the indicated y-coordinate zone and in dependence upon the correlation generating the discard signals.

8. The system defined in claim 7, further including selecting means operable by the operator of the testing system for establishing the number of x-coordinate zones, the number of y-coordinate zones, and thereby the number of x-y sectors, into which the decoding means subdivides the image picked up by the camera.

* * * * *